(12) United States Patent
Soatto

(10) Patent No.: US 6,944,327 B1
(45) Date of Patent: Sep. 13, 2005

(54) METHOD AND SYSTEM FOR SELECTING AND DESIGNING EYEGLASS FRAMES

(76) Inventor: Stefano Soatto, 655 Raymond Ave., Santa Monica, CA (US) 90405

( * ) Notice: Subject to any disclaimer, the term of this patent is extended or adjusted under 35 U.S.C. 154(b) by 754 days.

(21) Appl. No.: 09/706,217

(22) Filed: Nov. 3, 2000

Related U.S. Application Data

(60) Provisional application No. 60/163,489, filed on Nov. 4, 1999.
(51) Int. Cl.[7] ............................................. G06K 9/00
(52) U.S. Cl. ..................... 382/154; 351/227; 351/177; 705/27
(58) Field of Search ................................ 382/154, 155; 345/419, 427; 356/12; 705/27, 26; 351/204, 351/205, 178, 227, 246; 33/200, 507

(56) References Cited

U.S. PATENT DOCUMENTS

| | | | |
|---|---|---|---|
| 4,996,642 A | * | 2/1991 | Hey .............................. 705/27 |
| 5,576,778 A | * | 11/1996 | Fujie et al. ................. 351/177 |
| 5,983,201 A | * | 11/1999 | Fay .............................. 705/27 |
| 6,231,188 B1 | * | 5/2001 | Gao et al. ................... 351/227 |

OTHER PUBLICATIONS

Andrew Blake et al., "Active contours", pp 97-113, 1998.*
Rafic A. Bachnak et al., "A Stereo System For 3-D Measurement In Robot Workespaces", PP 293298, IEEE 1989.*
M.C. Burl et al., "Face Localization via Shape statistics", In. Proc. Of IEEE Conf. on Comp. Vision and Patt. Recog., 1995.*
Roger Tsai, "An Efficient and Accurate Camera Calibration Technique for 3D Machine Vision", IEEE Transactions on Robotics and Automation, pp 364-374, 1996.*

* cited by examiner

Primary Examiner—Samir Ahmed
(74) Attorney, Agent, or Firm—Michael A. Kerr

(57) ABSTRACT

The present invention provides a method and apparatus for designing and visualizing the shape of eyeglass lenses and of the front rims of eyeglass frames, and for allowing the customer to modify the design by changing the shape and style interactively to suit his/her preference and perceived character. The present invention comprises an interface for a lens grinding machine that allows the retailer to manufacture the selected frame at the store for certain specified styles, or allows the retailer to transmit the shape and style data to a manufacturer that can implement the selected design and deliver it directly to the customer. Another embodiment of the present invention is to provide a method for designing, visualizing, modifying the shape and style of eyeglass lenses and frames remotely through the Internet or other communication channel, and to transmit the design to a manufacturer, which enables the customer to select and purchase eyeglasses directly from manufacturers.

32 Claims, 7 Drawing Sheets

METHOD AND SYSTEM FOR SELECTING AND DESIGNING EYEGLASS FRAMES

CROSS REFERENCE TO RELATED APPLICATIONS

This application claims the benefit of U.S. Provisional Application No. 60/163,489, filed Nov. 4, 1999, which is hereby incorporated by reference in its entirety.

BACKGROUND OF THE INVENTION

This invention relates generally to eyeglasses and, more particularly, to a method and apparatus for designing and modifying the shape of eyeglass lenses and the front rims of eyeglass frames.

Eyeglass frames typically have a particular style (the combination of material, color, texture, feature decorations, and overall appearance) and a particular shape (the geometric description of the contour of the front rims of the eyeglass frame). For each style there may be several different shapes (e.g. round, square etc.), and for each shape there may be several different styles (metal, plastic, translucent, engraved, etc.). Eyeglasses, the combination of eyeglass lenses (hereinafter referred to as "lenses") and eyeglass frames, typically include lenses having a certain shape, eyeglass frames having a matching shape, a certain style, and a particular combination of functional elements (legs, nose pads and other functional elements).

In the eyeglass industry there is a conflict between a customer's desire for personalized design and the mass production employed by the industry. On one hand, it is believed that eyeglasses greatly influence the looks and perceived character of a customer, who often wears the glasses daily for long periods of time. This influence drives a desire to obtain a personalized design that fits a variety of criteria (e.g. facial features and style preferences of the customer, current fashion guidelines, social constraints etc.). On the other hand, the manufacturing industry operates on a large scale production in which eyeglasses are distributed to consumers via retailers. This large scale production causes the need for standardized design of eyeglasses. It appears that the industry has addressed this conflict by producing a large variety of shapes and styles, that customers review in a lengthy and often complex selection process. In addition, retailers stock a large inventory of eyeglass frames, which changes often, and hire a relatively large number of experienced employees to guide customers in their selection process.

In today's optical stores, it is typically the responsibility of the retailer to translate a customer's personality, style, and social preferences into shapes and styles of eyeglass frames, leading to a lengthy and frustrating process for the customer. The process becomes even more lengthy and frustrating for the customer when the retailer is not experienced or esthetically sensitive, does not properly communicate with the customer, or is just trying to serve more than one customer at a time.

BRIEF SUMMARY OF THE INVENTION

In one embodiment, a user utilizes a method and system to design, select, and purchase eyeglasses. The user accesses the system and visualizes an inventory of eyeglass styles and shapes previously stored in a database and displayed by the system. The user selects a particular eyeglass style and "virtually tries on" the selected eyeglasses in a size that matches the user's facial features. In addition, the method and system allow the user to interactively modify the choice by changing the shape, style, and color of the eyeglass frames. The system reviews the choices made by the user and provides a notification to the user if a selected modification is not allowed for the particular eyeglass frame chosen by the user. In an alternative embodiment, the system only allows the user to make interactive modifications that can be implemented at the optical store.

A user is able to modify the design while satisfying predetermined constraints due to manufacturing procedures and materials, as well as inventory status. In addition, a user is able to interactively modify previous choices by specifying a desired "character", e.g. more/less aggressive/assertive/personable etc. The system stores the current choice of style for later retrieval and comparison with other choices. The system further suggests alternative shapes and styles that reflect previous choices of the customer, or of other customers with similar taste preferences, utilizing collaborative filtering. The system also interfaces to machine tools (e.g. lens-cutting devices or eyeglass frame bending devices) that fabricate the selected design of shape and style and have the selected design ready to try on at an optical store. The system can be accessed remotely, such as from a home of the user, via a computer and an Internet connection, or other communication channel.

More particularly, the present method includes receiving at least one digital image of a face of a person, performing basic image processing operations such as color or light compensation, displaying to the user a variety of eyeglass shapes and styles available from manufacturers and retailers, matching a size of a selected eyeglass frame to a facial size and features of the person, and receiving input information such as inter-ocular distance or prescription details. In one embodiment, the system alters the image of the eyeglasses according to a motion of the person's head to simulate the appearance of wearing the eyeglasses on the person's face. In addition, the method includes interactively modifying the selected style and shape of the eyeglass frame while satisfying constraints due to manufacturing process and inventory. The system stores the generated images for later retrieval and comparison of different styles.

In another embodiment, the method further includes superimposing the selected eyeglasses to the digital image of the person's face to generate a virtual image of the person wearing the selected eyeglasses while moving. The system displays a visualization of the head of the person at video-rate and selects and tracks a number of features on the person's face. The system estimates the three-dimensional motion of the head, compensates for the motion, modifies the appearance of the model eyeglass frame, and superimposes the eyeglass image to make the eyeglasses appear stationary on the person's face.

In a further embodiment, the method and system can be utilized to modify the displayed shape of selected eyeglass lenses and front rims. The system includes a database of maps for shape, i.e., the position of a finite number of control points that determine the contour of the lens and the rim, and perceptual qualities, i.e., the "strength" of each adjective as recorded during experimental trials or setup by the retailer or by experts. The system modifies the selected shape by receiving information from the user regarding the amount of each descriptive quality. The system adapts the database to the clientele of a particular optical store and performs collaborative filtering to recommend shapes and styles that match the choices of previous customers with similar preferences.

In yet another embodiment, the system is given (e.g. by the manufacturer, based upon the material chosen) the constraints that a particular eyeglass frame must satisfy, e.g., the maximum curvature, tangent at the hinges and bridge, maximum size of the lenses, and others. The system verifies that the constraints of the selected eyeglass frames are met during the interactive modification procedure. The system also interfaces with machine tools for grinding eyeglasses and for shaping rims of eyeglass frames.

In a still further embodiment, the system is accessed remotely by a user who logs onto a remote access site and inputs one or more photographs of the person, or a live video stream. The user also inputs lens prescription data, when applicable, as well as the shape and style data. The system receives the information and transmits the shape and style data to eyeglass frame and lens manufacturers, who then ship the selected eyeglasses directly to the customer.

The above described system and method allow a customer to personalize the design of eyeglasses, and the retailer to reduce eyeglass inventory and the need for a high number of specialized employees. In the exemplary embodiment, the system includes a user interface that allows the customer to select desired modifications with minimal guidance by the retailer. The system can be operated remotely by the customer, for instance from home, by means of a computer, an Internet connection and a digitized picture of the customer's face, or a live camera connected to the computer, without going to an optical store.

The present invention thus relieves the customer from the lengthy and potentially frustrating process of selecting eyeglass shape and style through a retailer, relieves optical retailers from storing a large inventory of shapes and styles and having to hire experienced staff to assist customers in the process of selecting eyeglass frames, and it allows eyeglass manufacturers to sell their products directly to customers without intermediary distributors and retailers.

DETAILED DESCRIPTION OF THE INVENTION

Exemplary embodiments of systems and processes that facilitate design, selection and purchasing of eyeglasses are described below in detail. The system provides for interactive customized design of eyeglass shape to fit physical and perceptual customer features. In a first exemplary embodiment, the system is accessed from a retail or wholesale outlet and in a second exemplary embodiment, the system is accessed remotely. Corresponding to each embodiment, there are three operating modalities, i.e., two-dimensional, three-dimensional and two and a half dimensional.

The systems and processes are not limited to the specific embodiments described herein. In addition, components of each system and each process can be practiced independent and separate from other components and processes described herein. Each component and process also can be used in combination with other components and processes.

Figure 1:
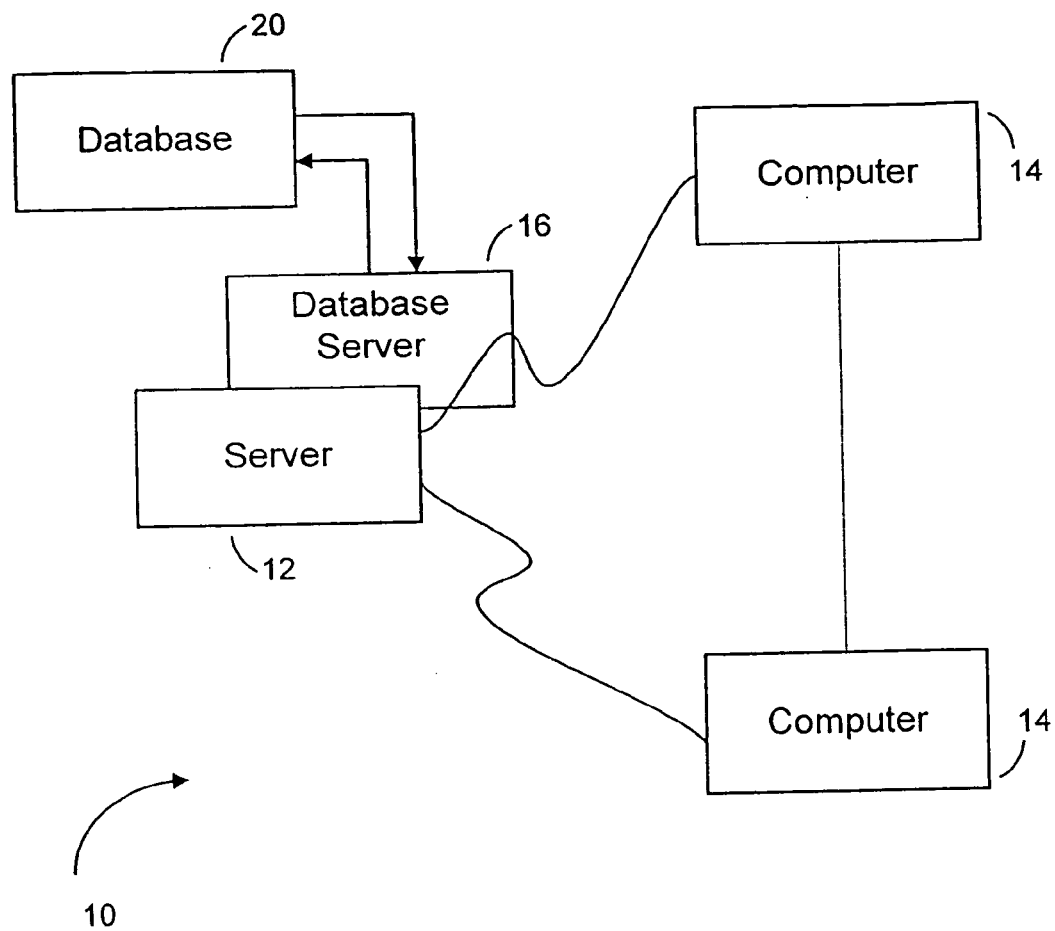
FIG. 1 is a block diagram of a system in accordance with one embodiment of the present invention.

FIG. 1 is a simplified block diagram of an interactive eyeglass system 10 including a server system 12, hereinafter referred to as server 12, and a plurality of client systems 14 connected to server 12. In one embodiment, client systems 14 are computers including a web browser, such that server 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone or other web-based connectable equipment.

A database server 16 is connected to a centralized database 20 containing eyeglass-related information, as described below in greater detail. In one embodiment, centralized database 20 is stored on database server 16 and can be accessed by potential users at one of client systems 14 by logging onto server 12 through one of client systems 14. In an alternative embodiment centralized database 20 is stored remotely from server 12.

System 10 utilizes a web-enabled interactive database to automate customized selection and design of eyeglasses. System 10 receives all input information and provides feedback and recommendations based upon user input. In one exemplary embodiment, system 10 utilizes a Relational Database with a client user interface front-end for administration and a web interface for standard user input. Information is accessed in the database through Structured Query Language (SQL).

Figure 2:
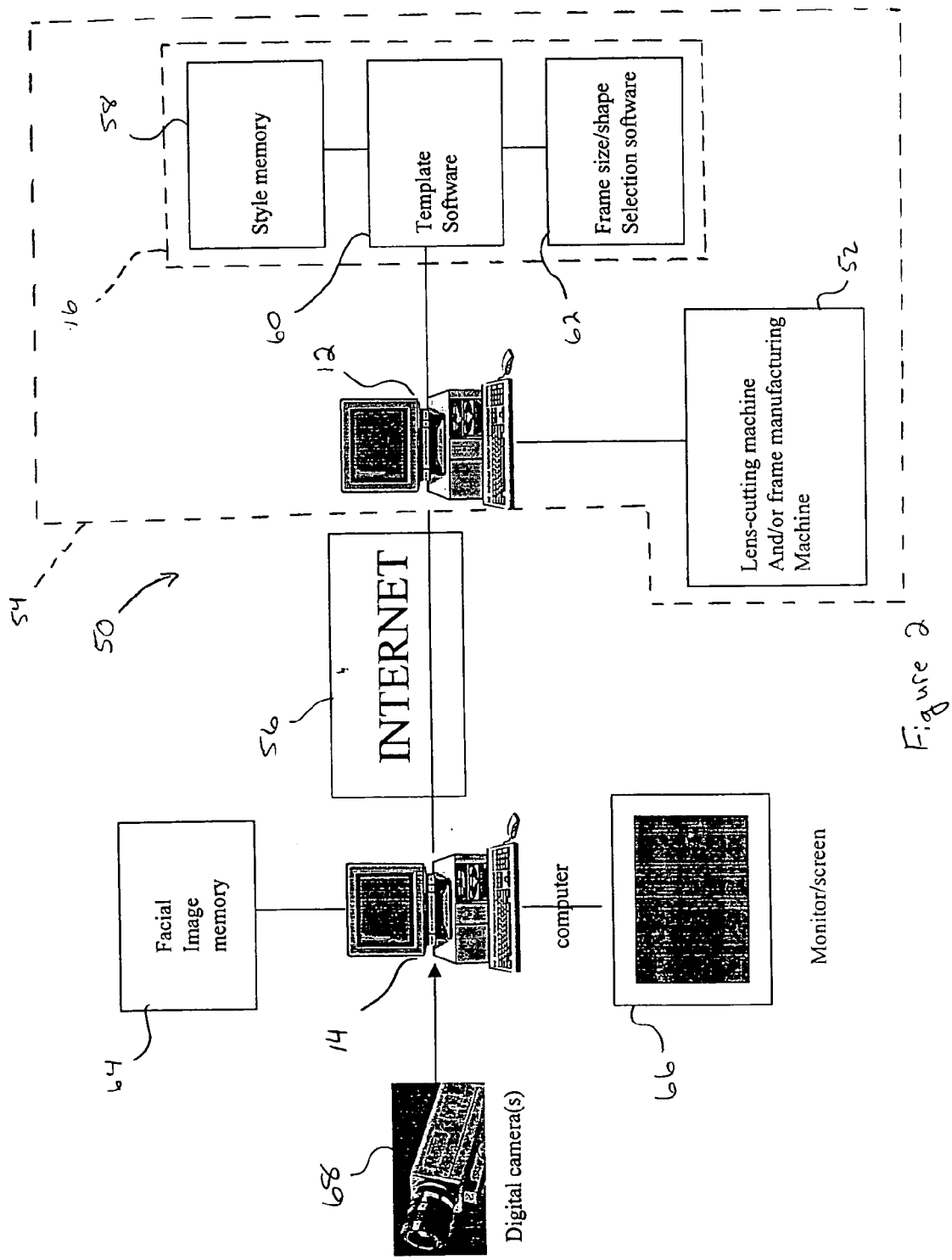
FIG. 2 is an expanded block diagram of a first exemplary embodiment of the system shown in FIG. 1.

FIG. 2 is an expanded version block diagram of an exemplary embodiment of an interactive eyeglass system 50. Components in system 50, identical to components of system 10 (shown in FIG. 1), are identified in FIG. 2 using the same reference numerals used in FIG. 1. System 50 includes server system 12 and at least one client system 14 coupled to server 12 via an Internet connection. In an alternative embodiment, server 12 includes a database server 16, an application server 52, a web server (not shown), a fax server (not shown), a directory server (not shown), and a mail server (not shown). Servers 16, 52, and the other servers are coupled in a local area network (LAN) 54. In one embodiment, a system administrator's workstation (not shown), user workstation 14, and a supervisor's workstation (not shown) are connected to server 12 via LAN 54. Alternatively, workstation 14 and the other workstations are coupled to LAN 54 via an Internet link 56 or are connected through an Intranet (not shown).

Each workstation is a personal computer having a web browser. In another embodiment, server 12 is configured to be communicatively coupled to various individuals or employees and to third parties, e.g., manufacturers, wholesalers, and others via an ISP Internet connection. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN, a LAN could be used in place of the WAN.

Database server 16 includes a style memory database 58, a template software database 60 and an eyeglass frame size/shape selection software database 62. User device 14 includes a facial image memory database 64, a monitor/screen 66 and a digital camera 68. In an alternative embodiment, system 50 includes multiple user devices. Server 12 is connected to user device 14 via a network, such as the Internet, an Intranet, or another wide area network.

Figure 3:
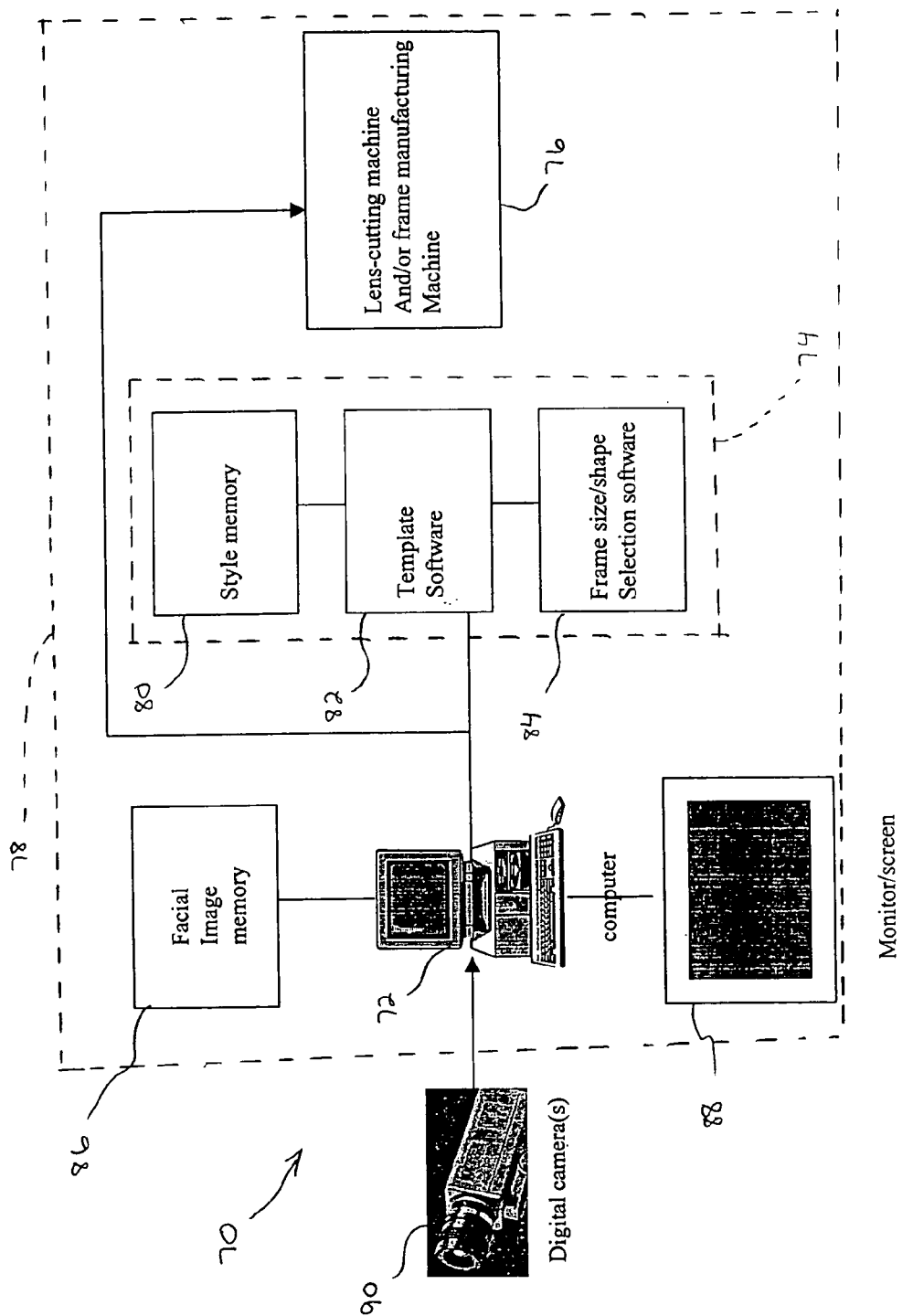
FIG. 3 is an expanded block diagram of a second exemplary embodiment of the system shown in FIG. 1.

FIG. 3 is an expanded version block diagram of an alternative embodiment of an interactive eyeglass system 70. System 70 includes a computer 72 that includes a database server 74, an application server 76, a web server (not shown), a fax server (not shown), a directory server (not shown), and a mail server (not shown). Computer 72, servers 16, 52, and the other servers are coupled in a local area network (LAN) 78. In one embodiment, multiple workstations are connected to computer 72 via LAN 78. Although the functions performed by the servers are illustrated as being performed by separate servers, such functions can be performed at one or multiple servers coupled to LAN 78. The servers are illustrated as being associated with separate functions only to facilitate an understanding of the different types of functions that can be performed by system 70. Database server 74 includes a style memory database 80, a template software database 82 and an eyeglass frame size/shape selection software database 84. Computer 72 also includes a facial image memory database 86, a monitor/screen 88 and a digital camera 90.

Figure 4:
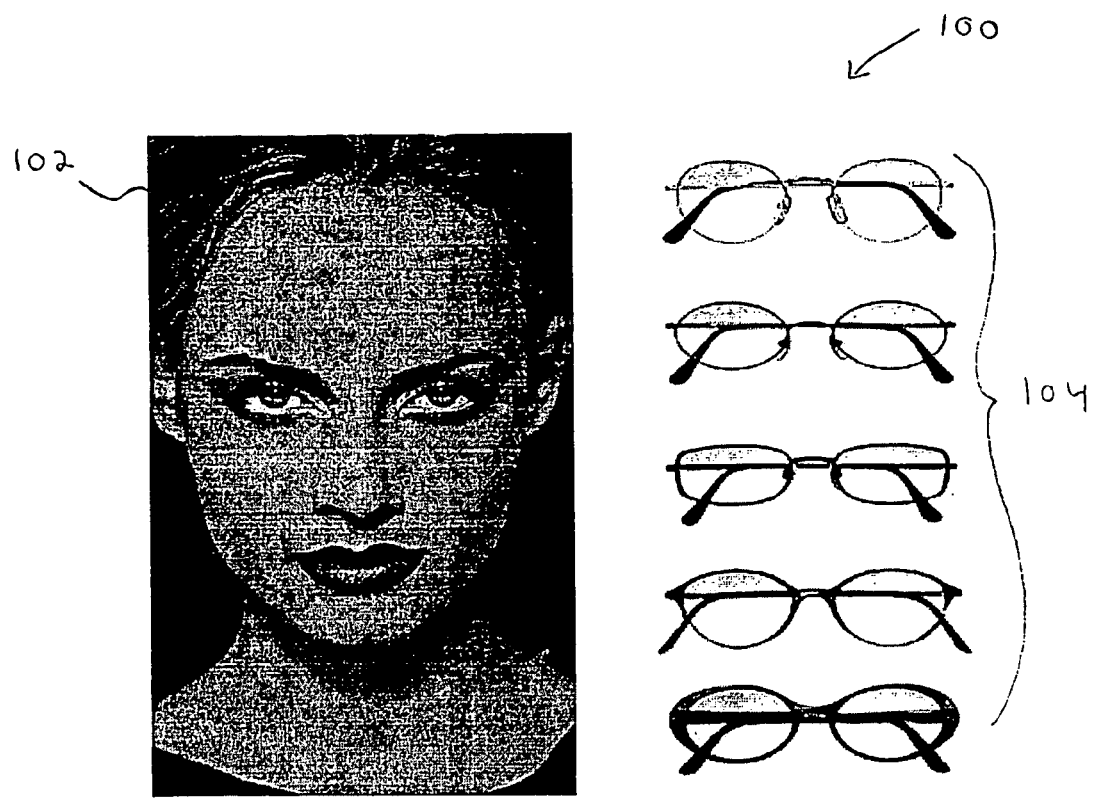
FIG. 4 is an exemplary embodiment of a first user interface.

FIG. 4 is an exemplary embodiment of a first user interface 100 including an image of a person's face 102 and a plurality of icons 104 representing a selection of eyeglass frames. The eyeglass frames are displayed sequentially, and the user scrolls up and down using a pointing device. In an alternative embodiment, the eyeglass frame are grouped according to a particular criterion such as material, manufacturer, shape (e.g. rounder shapes, angular shapes etc.), by fashion designer, etc. and organized, for instance, into a tree structure with pull-down menus and can be searched by such groupings.

The system computes a size of the eyeglass frames for the particular facial size and features, and superimposes the selected style to the image of the user to create a virtual image of the user wearing the selected eyeglass frame. In addition, the system requests scale information, such as inter-ocular distance. If such information is unavailable to the system, the system uses a default (inter-ocular distance=10 cm), and prompts the user for the correct distance upon ordering or purchasing the eyeglass frames.

Figure 5:
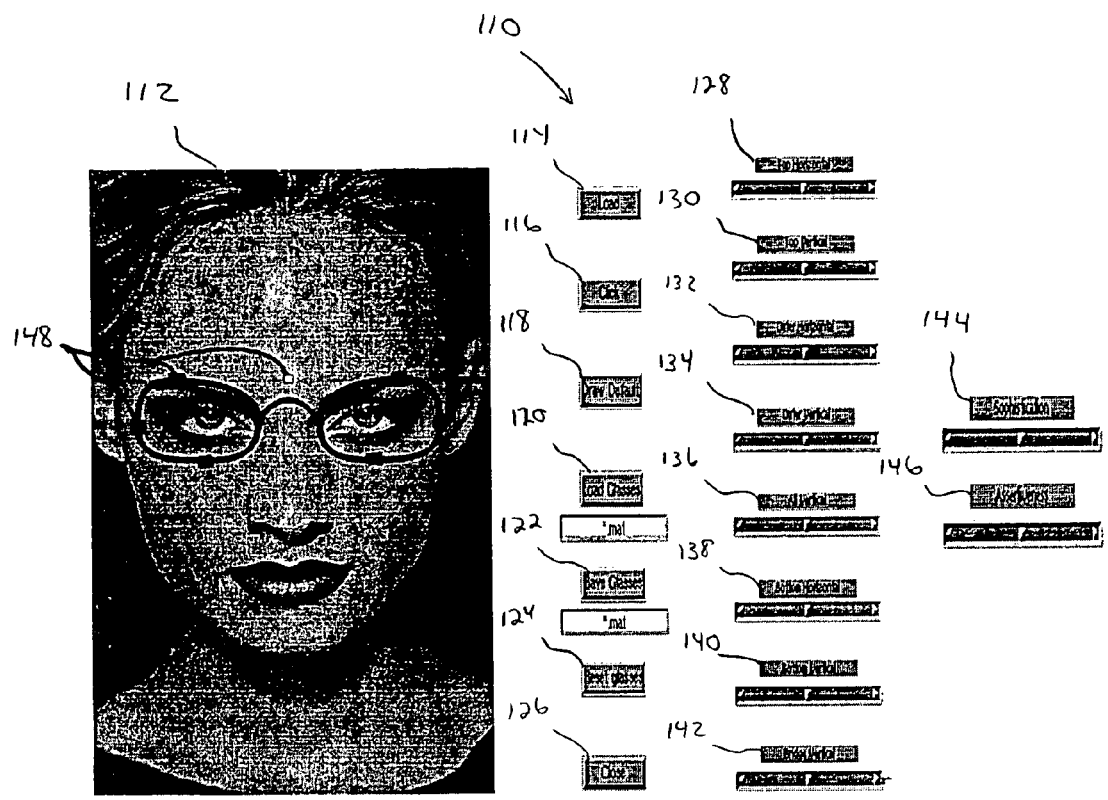
FIG. 5 is an exemplary embodiment of a second user interface.

FIG. 5 is an exemplary embodiment of a second user interface 110 including an image of a person's face 112 wearing a pair of eyeglass frames selected by the user from first user interface 100. Interface 110 also includes a plurality of radio buttons including a load button 114, a click button 116, a draw default button 118, a load glasses button 120, a save glasses button 122, a reset glasses button 124, and a close button 126. In addition, second user interface 110 includes a plurality of sliding buttons including a top horizontal button 128, a top vertical button 130, an outer horizontal button 132, an outer vertical button 134, an all vertical button 136, a bottom horizontal button 138, a bottom vertical button 140, a bridge button 142, a sophistication button 144, and an assertiveness button 146.

The selected shape is matched to the facial size and features of the person's face and displayed superimposed to the image of the face to create a virtual image of the user wearing the selected eyeglass frame. Utilizing a pointing device, such as a mouse, the user modifies the selected shape by dragging a certain number of control points 148 (seen as enlarged squares on the image) in different positions of the image. Alternatively, the user changes the shape by moving sliders 128–146 that control the horizontal and vertical position of each control point. The modified image is saved by storing the image. Another style is then loaded and the process is re-initiated. The user, at any time, can retrieve all the selected designs for comparison.

Figure 6:
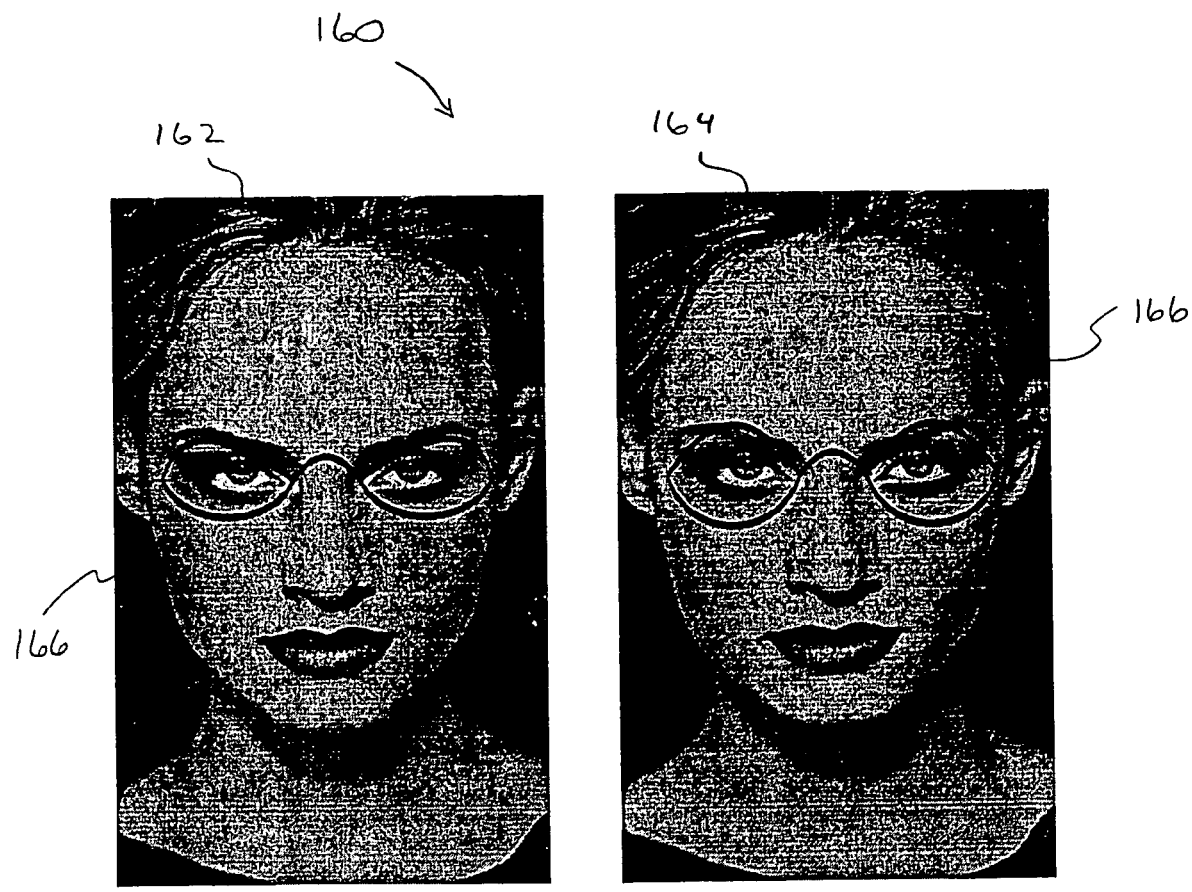
FIG. 6 is an exemplary embodiment of a third user interface.

FIG. 6 is an exemplary embodiment of a third user interface 160 for simultaneous view of multiple selected designs for comparison, including a first image of a person's face 162 wearing a pair of eyeglass frames selected and manipulated by the user via interfaces 100 and 110 and a second image of a person's face 164 wearing a pair of eyeglass frames selected and manipulated by the user via interfaces 100 and 110. A plurality of control points 166, modified in the previous interface, are now fixed and indicated by a "+". A user manipulates a position of the control points to alter the perceptual characteristics of the eyeglass frames as will be described in detail below. By using techniques such as collaborative filtering, the system can be prompted to suggest styles and shapes according to the preferences of other customers that best match the choices of the current customer.

Figure 7:
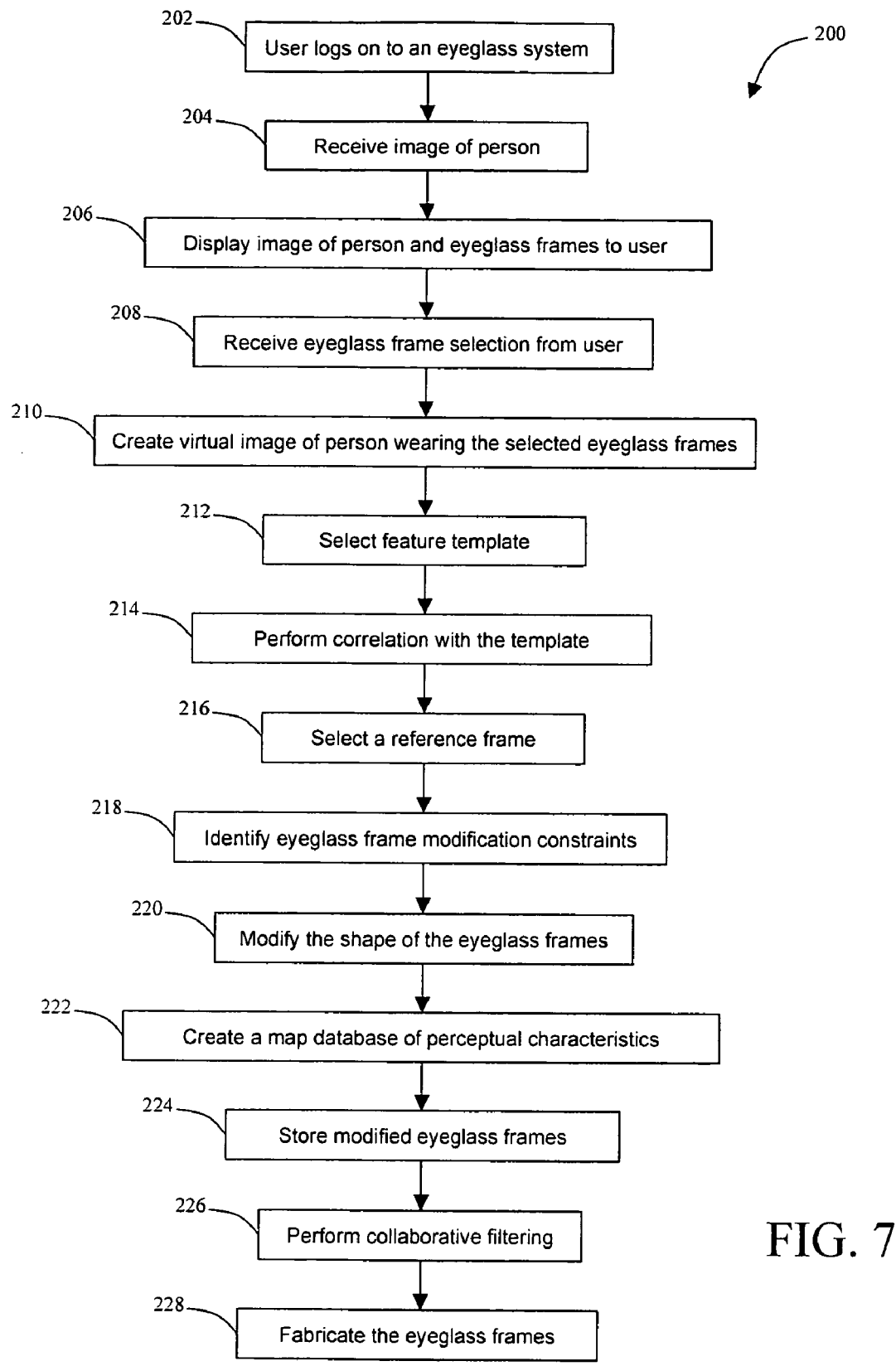
FIG. 7 is a method for selecting and modifying eyeglass-frames.

FIG. 7 illustrates a method 200 for designing, selecting, and purchasing eyeglasses. Method 200 is illustrated in a logic diagram form. However, it should be understood that such method could be performed in any sequence, in a distributed manner, or in parallel, and no specific execution order is intended, expressed or implied, by such flow. Also, any one of the functions illustrated in FIG. 7 could be performed without necessarily performing, within a certain time limitation, any of the other functions.

Data Acquisition and Visualization

A user logs on 202 to an eyeglass system, such as one of systems 10, 50, and 70, (shown in FIGS. 1, 2, and 3, respectively), and is then presented with first user interface 100. One or more images (such as image 102 shown in FIG. 4) of a face of a person is acquired by a user utilizing one or more cameras. The image is received 204 by system 10 and is stored in electronic format utilizing a computer and other peripherals (e.g. a scanning device, or a frame-grabber board). In one embodiment, the camera is a conventional camera. In an alternative embodiment, the camera is a digital camera.

After the image is stored in electronic format on system 10, the image is displayed 206 by system 10 (such as in first user interface 100 shown in FIG. 4) utilizing a computer monitor, such as monitor 62 shown in FIG. 2, or other visualization device (e.g. a television monitor) as describe below in greater detail. User interface 100 includes a plurality of icons each representing a different style available for purchase. Each style has been previously inputted into a database (such as eyeglass frame size/shape selection software database 62 shown in FIG. 2) that includes a prototype, including color, geometric properties (e.g. tangent directions at the hinges and bridge, perimeter of the rim for rimmed eyeglass frames), reflectance properties of the material, structural properties (such as maximum curvature of the rim) as well as photographs of the eyeglass frames taken from several viewpoints.

System 10 utilizes standard techniques from computer graphics to generate an image of the eyeglass frame as seen from any viewpoint as is known in the art. (See for example, Foley et al., "Computer Graphics", Addison Wesley, 1997 [hereinafter referred to a Foley et al.] Chapter 16). Alternatively, photographs from several viewpoints can be combined to yield a panoramic view. See for example, "Quicktime VR©", a commercial product available from Apple Computer, Inc. The icons display a frontal view of the eyeglass frame. In addition, the user can select a pair of eyeglass frames and change the viewpoint by using a pointing device as is known in the art. See for example, Foley et al., Chapter 17.

Two-Dimensional Model Acquisition and Visualization

In the two-dimensional modality, after a frontal image of the person's face is inputted into system 10, a two-dimensional model of the face is generated by system 10, which utilizes a two-dimensional orthonormal reference frame uniquely associated with the person's face. Such a reference frame is determined by the position of two points, one being the origin of the reference frame (i.e. the point with coordinates "(0,0)") and the other being the unit along one of the two axes (e.g. the "x"-axis) having coordinates "(1,0)". The other axis (e.g. the "y"-axis) is then automatically determined as the axis perpendicular to the "x"-axis and having the same unit. In an exemplary embodiment, the origin of the reference frame is chosen to be the mid-point of the linear segment that connects the centers of the pupils of the two eyes, and the unit along the "x"-axis is chosen to be the center of the pupil of one eye (e.g. the left eye). In the preferred embodiment, the location of the center of the pupil of the eyes is determined in two steps. First, the location is coarsely determined by the user who indicates the approximate location utilizing a pointing device (the user is requested to click on the center of each eye). Second, the location is refined automatically using a template search as is well known. (See, e.g., Blake and Isard, "Active Contours", Springer Verlag, 1998). System 10 computes the correlation between a set of stored templates representing the eye, possibly at different levels of resolution, orientation, and size, and located in different positions around the point selected by the user as the approximate location of the center of the eye. In one embodiment, the templates are in gray-scale and for the template correlation, only the gray-scale version of the image is used. Sub-pixel interpolation can be performed by interpolating the value of pixels between points on the pixel grid and repeating the template correlation search on a finer grid, as is well known in the art. The point scoring the largest correlation value for all choices of templates is selected as being the center of the pupil of the eye.

In an alternative embodiment, an algorithm for face localization is utilized to locate the position of the eyes in the image. See for example, Burl et al., "Face localization by shape statistics", In Proc. of the IEEE Intl. Conf. on Comp. Vision and Patt. Recog., 1996.

An outline of the person's face is then described as an ellipse, and is specified by a length of the face's two major axes and the position of the face's center. Such a length is determined utilizing another template search analogous to the template search used to locate the eyes. However, when determining the length of the face's two major axes, the template utilizes an ellipse that can be translated along the vertical ("y") axis, and expanded along the "x" and "y" axes to score the highest correlation with the image of the face. The image is heavily sub-sampled to speed up the correlation search. Since faces are typically symmetric, a search along the "y" direction is not performed. A search along the "y" direction, however, can be added as a secondary feature for faces that are asymmetric, or where a user desires a more precise image. In the exemplary embodiment, system 10 assumes that the major axis is aligned with the vertical ("y") axis and the minor axis is aligned with the horizontal ("x") axis. However, the photograph of the customer may not be perfectly aligned along the vertical axis, and therefore the photograph needs to be compensated. Compensation is accomplished by allowing the template of the face to rotate, which adds a degree of freedom, and to be asymmetrical, thereby allowing an additional degree of freedom. In one embodiment, compensation of the photograph is performed automatically as a template search, as is standard in the art. In an alternative embodiment, compensation of the photograph is performed interactively by having the user select a number of key points. For example, the user is asked to select the center of the chin and the hairline, which together determine the position and orientation of the major axis of the ellipse, as well as the upper contour of the left and right ear, which determine the orientation of the minor axis of the ellipse. A variety of other implementation solutions are also possible, which do not distort the general embodiment and are therefore not discussed herein.

Three-Dimensional Model Acquisition and Visualization

In the three-dimensional modality, two or more cameras are rigidly mounted on a rig (a rigid infrastructure of pedestals), spaced about 1 m apart, and camera parameters are calibrated using standard techniques for stereo calibration as is well known. See for example, R. Tsai, "An Efficient and Accurate Camera Calibration Technique for 3D Machine Vision", IEEE Transactions on Robotics and Automation, 1986. The calibration includes calibration of so-called "intrinsic parameters" (focal length, optical center, size of the pixel, skew factor, and lens distortion) as well as so-called "extrinsic parameters" (the relative position of each camera). The position of the epipoles (the projection of the focal point of a camera onto an image plane of another camera), is estimated first, and then compensated so that epipolar lines (the projection of the epipolar plane, i.e. the plane containing two optical centers and a point on the scene, as described in Faugeras) correspond to scan-lines according to standard techniques. (Faugeras, "Three-dimensional vision, a geometric viewpoint", MIT press, 1992, [hereinafter Faugeras] which is incorporated by reference), described for instance in section 6.3 of Faugeras.

A digital picture of the person's face is then acquired simultaneously by the two (or more) cameras against a uniformly colored background (e.g. black) using controlled light (e.g. two diffusing lamps). A normalized correlation, as is well known (see for example, Faugeras, Chapter 6.4), is performed to determine a disparity of corresponding pixels in the images. Such correlation is performed in a multi-scale fashion. Standard triangulation techniques, as are well known, (see for example, Faugeras, Chapter 6) are used to obtain a mesh of the three-dimensional position of each pixel, which constitutes the first, rough three-dimensional model of the face. A refined model of the face is then obtained by a template search against a stored three-dimensional face template using standard techniques in Computer Graphics. Several templates are stored to accommodate a variety of faces (e.g. wider/narrower/rounder/angular).

Once a three-dimensional model of the face is generated, the two (or more) images are mapped onto the model to generate a three-dimensional image, using standard texture-mapping techniques. (See for example, Foley et al., Chapter 16.3). The three-dimensional image is then displayed to the user. The user can change a viewpoint of the image utilizing a pointing device, and a new image is displayed so the user can view the image from the selected viewpoint, again using standard rendering techniques. (See for example, Foley et al., Chapter 16). If the three-dimensional image is determined to not be satisfactory, system 10 displays one of a two-dimensional modality and a two-and-half-dimensional modality (described below in greater detail).

Style Selection and Size Determination

Once an accepted model of the face is obtained and displayed by system 10, whether two-dimensional or three-dimensional, a set of icons is displayed adjacent the face model. Each icon represents one style of eyeglass frames available for purchase. In one embodiment, the eyeglass frames are available from a retailer. In an alternative embodiment, the eyeglass frames are available from a manufacturer. In a further embodiment, the eyeglass frames are available from a wholesaler.

The user selects a particular style by selecting an icon corresponding to a desired eyeglass frame. System 10 receives 208 the selection and uses information from the model to determine an appropriate size of the eyeglass frames. For example, the manufacturer may specify a recommended size (e.g. diameter of the lens, width of the bridge) in units of inter-ocular distance and/or as a function of the width of the eye.

Visualization of Selected Style

The selected style, in the selected material and in the size matched to the face of the customer according to the manufacturer's guidelines is displayed on the image of the person's face to create 210 a virtual image of the customer wearing the glasses. In the two-dimensional modality, a frontal view of the eyeglass frame is rendered using standard techniques obtained from ray tracing. (See for example, Foley et al., Chapter 14). The eyeglass frames are positioned on the model so that the centers of the lenses are aligned with center of the pupils of the eyes. Alternatively, the pixel values of a photo can be substituted to the image values so as to "superimpose" the photo of the eyeglass frames to the image of the user. If no inter-ocular distance is available, all geometric quantities will be rescaled to the inter-ocular distance as measured on the image in pixel coordinates. Although the inter-ocular distance is not an absolute number, the distance suffices for visualization, since all other geometric quantities will be scaled accordingly. However, in order for the customer to purchase an actual eyeglass frame, the system prompts the user to input an inter-ocular distance, as measured by an optometrist or as available from previous prescriptions or measured using any available method or apparatus.

In the three-dimensional modality, a full three-dimensional model is available including metric information. In this modality the eyeglasses are rendered as seen from the viewpoint selected by the user with a pointing device as is well known (See for example, Foley et al., Chapter 16) and/or using standard visualization packages. For the purpose of rendering, when system 10 is operated at an optical store, the user has available the position of the light sources, which is necessary for rendering the view of the glassframes. In an alternative embodiment, system 10 defaults to diffuse illumination. In a further alternative embodiment, system 10 prompts the user to input a position of the light source.

In a still further embodiment, and to increase the realism of the displayed image, the appearance of the lenses is taken into account by system 10. For sunglasses, the appearance of lenses is taken into account by coloring the area occupied by the lens in the image with a prescribed color. However, depending upon specifications of the desired lenses, prescription lenses typically require additional processing since the area occupied by each lens is warped with a template that depends upon a prescription strength and nature of the lens. In one embodiment, the template warps a larger area of the image into the area occupied by the lens such as in the case of myopia-correcting lenses. In an alternative embodiment, the template expands the area occupied by the lens and crops its edges such as in the case of far-sightedness. When the position of the light source is known, specular highlights are added to increase image realism.

Two-and-a-Half-Dimensional Model Visualization

In a 2½-dimensional modality, the user moves his/her head and system 10 displays a chosen eyeglass frame of the image and modifies the image so that the selected eyeglass frames appear to move with the viewer and therefore seem attached to his/her head. This 2½ dimensional modality does not utilize a full three-dimensional model and can be implemented with a single camera.

After the eyeglass frames image has been superimposed on the image of the person's face, a feature template is selected 212, either manually by having the user click on relevant features such as the corners of the eyes, nostrils, eyebrows etc. of the image, or automatically by performing 214 correlation with a stored database of templates for eyes, mouths, eyebrows, nostrils etc. The location on an image plane that scores the highest correlation with the template is chosen as the candidate position for the corresponding feature. Each feature is then tracked from image to image by performing correlation only in a neighborhood of the corresponding position at the previous image. In one embodiment, the size of the neighborhood is fixed or adjusted by the user. In an alternative embodiment, the size of the neighborhood is set by system 10. Alternatively, the correlation search is performed in a coarse-to-fine fashion by allowing a template to exist at several levels of resolution, and using feature locations at coarse resolution to initialize the search at the finer resolution. Coarser and finer representation of the image is obtained using standard techniques such as filtering and down-sampling, or wavelet transforms.

While the position of feature templates is tracked from image to image their relative position is used to define the motion of and select 216 a reference frame. This reference frame is one of a 2-D Euclidean, 2-D affine, 2-D projective and 3-D Euclidean, in increasing order of generality. In the 2-D Euclidean case, the constellation of positions of feature locations is interpreted as moving according to a Euclidean planar motion, which is described by 3 parameters. The parameters are a translation in the plane (one component along the "x" axis and another component along the "y" axis) and a rotation about an axis perpendicular to the plane. The eyeglass frames model is then animated by moving it rigidly onto the image plane and superimposing the eyeglass frames model onto the person's image, such that the eyeglass frames model has the same rotation and translation as the person's image. This 2-D Euclidean transformation only accounts for a restricted range of motions of the customer's head, i.e., a fronto-parallel translation and a rotation about the sagittal plane.

To accommodate rotations about a vertical axis, which the customer typically performs to see a profile, a more general transformation is necessary. The simplest translation that accommodates rotations about a vertical axis is an affine transformation, which is described by 6 parameters. The parameters include a translation and a linear deformation of the planar coordinates. This affine transformation takes into account rotations about a vertical plane only when the object of interest (in this case the eyeglass frame) is far enough from the camera, so that parallel projection is a good approximation of perspective. In particular, under a planar affine transformation parallel lines remain parallel, and therefore no "perspective" effect will be visible on the deformed appearance of the eyeglass frames. To take into account perspective effects, a projective transformation is necessary. This is described by 8 parameters, and models the image of a plane moving rigidly in space. To the extent that the features detected are well modeled as belonging to a plane (which is a good approximation for eyebrows, nostrils, corners of eyes etc.), the model generated using a projective transformation is accurate.

For an even higher precision one may estimate the full Euclidean motion of the configuration of feature points in space. This estimation can be accomplished using published algorithms in the field of Computer Vision, for instance Chiuso et al., "3D structure from visual motion causally integrated over time: experiments", in Proc. of the IEEE Intl. Conf. on Comp. Vision and Patt. Recogn., 2000.

The estimated transformation, whether Euclidean, affine or projective, is used to modify the appearance of the template of the eyeglass frames. By animating the eyeglass frames with estimated motion parameters, and rendering the eyeglass frames using standard computer graphics techniques, the eyeglass frames will appear as if they were attached to the person's face and moving with it. The user is then free to move his/her head around, and the face is displayed as if the glasses were being worn, thus creating a moving, virtual image of the face wearing the glasses (acting as a "virtual mirror").

Note that the two and a half dimensional modality does not require accurate knowledge of the shape of the head, but only of the motion of a few landmark points (e.g. corners of the eyes, mouth and ears).

When specular reflections are added to the appearance of the lenses for realism, it is necessary to move the position of the highlight corresponding to the motion of the head. Since rendering the appearance of a prescription lens requires processing the image, it may be inappropriate to render the appearance in this imaging modality, since significant computational resources would be needed for this rendering.

Classification of Eyeglass Frames and Constraints on Their Shape

While the shape of certain eyeglass frames can be modified to a great extent (e.g. rimless eyeglass frames) and still be manufactured at the optical store, other eyeglass frames (e.g. plastic eyeglass frames) can only be modified to a limited extent. Corresponding to each eyeglass frame, system 10 is equipped with a database of constraints on the maximum curvature, tangents at the hinges, and other shape constraints determined by the material. Eyeglass frames can be divided into three different categories depending upon the material properties of the eyeglass frame and an appropriate database of constraints identified 218.

The first type of eyeglass frame is a highly deformable shape. Eyeglass frames having a highly deformable shape include rimless eyeglass frames and wire eyeglass frames where the constraints on the shape is restricted only by the shape of the lens. The second type of eyeglass frame is a locally deformable shape. Eyeglass frames having a locally deformable shape include metal eyeglass frames whose shape can be molded on the shape of the lens, as long as the shape preserves the perimeter, tangent at the hinges and bridge, and maximum curvature specified by the manufacturer. The third type of eyeglass frame is a minimally deformable shape. Eyeglass frames having a minimally deformable shape include plastic eyeglass frames whose shape can be deformed to a small extent, while preserving perimeter, tangent at the hinges, and maximum curvature.

In addition, a custom deformation option (CD) refers to the option, presented to a customer, to realize deformation not possible at the optical store. The shape and design information is transmitted to a manufacturer that fabricates a custom eyeglass frame to be shipped to the customer. The modifications allowed under the CD option depend upon the manufacturing facilities and the production plan adopted by the manufacturer. Based upon the style chosen by the customer, system 10 permits certain modifications and warns the user when a modification to be made requires the CD option.

Interactive Shape Modification

The user modifies 220 the selected eyeglass frames as described below. The shape of each of the eyeglass frames stored in memory is represented as a parameterized curve. In the exemplary embodiment, the curve is represented by a spline having a certain number of control points. For rimmed eyeglass frames, the cordal representation of the control points is used so that the perimeter of the front rim is approximately constant. The contour is then represented by a piecewise linear curve, where the control points are the junctions between linear segments. Once a style has been selected, the user is allowed to modify the shape interactively using a pointing device and changing the position of each control point, highlighted in the display by a square or a cross, or other identifier. In the case of rimmed eyeglass frames, where the contour of the eyeglass frame is represented using the cordal representation, changing the position of one control point alters the position of adjacent control points as well. After the modification request has been input by the user, system 10 refines the modification by finding the closest curve that has the prescribed perimeter, as is well known and described by (Olver et al., "Differential invariant signatures and flows in computer vision: a symmetry group approach", Technical Report, Department of Electrical Engineering, University of Minnesota, Dec. 6, 1996). In addition to changing the position of the control points by dragging them using a pointing device, the customer moves the control points by acting on a set of rulers that correspond to the horizontal and vertical position of each control point.

Depending upon the material properties of the eyeglass frames selected, the system only allows certain modifications. For each modification of the position of a control point, the maximum curvature is computed utilizing known techniques, such as that described in Olver et al. (ref. cit.) or using the cordal approximation. Only positions of control points that meet the specifications on maximum curvature are permitted by system 10. The constraints on modifications determine a region where control points can be moved, outside which the eyeglass frame does not meet the specifications set by the manufacturer. For rimless eyeglass frames the region will be large, while for plastic rimmed eyeglass frames the region will be small. In the cordal representation these constraints can be easily taken into account. The tangent at the hinges is kept constant by not allowing the two control points adjacent to the hinges to be modified. The maximum curvature is kept below a certain bound that depends upon the material of the particular eyeglass frame being designed. The maximum curvature is kept below the certain bound by limiting the maximum angle between two adjacent segments.

Shape Modification Based on Perceived Characteristics

In addition to allowing the user to modify the shape of the eyeglass frames by acting on the control points that represent the contour of the lens, system 10 changes the shape of the eyeglass frames by controlling the amount of certain perceptual properties of the shape of the eyeglass frames as described below. System 10 includes a database of maps between shape and perceptual characteristics. In the simplest instance, the user defines a one-to-one map between the position of a control point and a perceptual characteristic. For instance, the horizontal position of the intersection of the tangents at the edges of the top rim is put in one-to-one correspondence with perceived "aggressiveness". When such a point is close to the center of the face, and therefore the upper rim appears to slant outward, the corresponding shape is declared as "non-aggressive", while when such a point is close to the outside edge, so that the upper rim slants inward, the corresponding shape is declared to be "aggressive"; in between these two positions there is a continuum of eyeglass frames, see, for example, FIGS. 5 and 6.

The position of such a point is then mapped directly into the degree of "aggressiveness" and stored 222 in a database. In general, perceptual characteristics are mapped into combinations of positions of control points. Combinations of "geometric coordinates" (i.e. positions of the control points) can be made to correspond to one or more combinations of "perceptual coordinates" (i.e. amount of certain perceptual characteristics, such as "aggressiveness, assertiveness" etc.) as follows. Calling $X=[x1, y1, x2, y2, \ldots, xN, yN]$ the geometric coordinates (the position on the image plane of N control points) and $P=[p1, p2, \ldots, pM]$ the vector that represents the amount of each of M perceptual quantities as stored in the database, or determined by the manufacturer, the retailer or other expert.

For each image, there is a map between these two vectors of numbers. The simplest case consists of a linear map where a matrix A transforms perceptual coordinates into geometric coordinates $X=AP$. The matrix A can either be assigned by experts, or it can be estimated from data collected (a number of corresponding vectors $X1, \ldots, Xk, P1, \ldots, Pk$) during psychophysical experiments, using standard tools from statistical estimation and numerical linear algebra. Psychophysical experiments are designed by generating k random shapes (thereby providing the data $X1, \ldots, Xk$) superimposed to images of random customers. Test subjects evaluate the amount of perceptual characteristics according to standard psychophysical procedures, thereby assigning amounts of perceptual characteristics $P1, \ldots, Pk$. In a simple example, Shown in FIGS. 5 and 6, $M=N=1$, so that A is a scalar quantity (a number), which is assigned manually. More generally, any other map between perceptual and geometric coordinates can be implemented, including nonlinear functions, fuzzy maps, and neural networks etc.

The map database is flexible, since it has to fit the desires and the specifications of the manufacturer and/or the retailer. In particular, the manufacturer and/or the retailer are able to choose which perceptual characteristics to use as a "basis", depending upon the particular eyeglass frame selected, or depending upon the particular clientele expected at a particular optical store. A characteristic of the design, however, is the presence of a map between geometric features and perceptual characteristics. In the exemplary embodiment, the features map is constructed ad-hoc by associating the perceptual characteristic "aggressiveness" to a horizontal position of the central control point of the upper contour of the rim. The map between the position of control points and a set of perceptual properties such as assertiveness, personability, conservativeness, intellectuality etc. represents a re-parameterization of the state-space of the eyeglass frame, which is the position of each control point.

Database Modification

The map database can be left un-modified, or can be modified interactively thereby adapting to particular clientele of a given optical store. Modification of the map database is achieved by allowing the users to input the amounts of a given perceptual quality as if the map was continuously being adapted. User input acts as additional data which system 10 uses to modify the map previously stored according to the same standard psychophysical procedures adopted to generate the map.

Storage of Selected Designs and Visualization for Comparison

Once a selected style and shape is considered to be satisfactory by the user, it is stored 224 by system 10 upon the transmission by the user of a save command, such as the user selecting a save icon. System 10 then allows the user to select a different eyeglass frame style and initiate the design process again. At any point in time the user can retrieve all selected eyeglass frame and view them one next to the other for comparison, as shown in FIG. 6.

Suggestion of Preferred Shapes and Collaborative Filtering

After the customer has saved a number of preferred choices of shapes and styles, system 10 uses collaborative filtering 226, such as described in U.S. Pat. Nos. 4,870,579 and 4,996,642 to identify shapes and styles that are preferred by groups of customers whose choices most closely resemble the choices of the current customers. System 10 receives customer requests for assistance in selecting eyeglass frames upon the user selecting a help icon. System 10 then displays to the user choices obtained via collaborative filtering.

Interfacing to Lens-Cutting Machines

As described above, server 12 is connected to application server 52. In one embodiment application server 52 controls a lens-cutting machine. In addition, application server 52 controls an eyeglass frame manufacturing machine. Server 12 transmits information and data to application server 52 which is utilized to fabricate 228 the lens and the eyeglass frame. The shape of the lens is determined by a parametric curve that is transmitted electronically to the lens-cutting machine which grinds a dummy lens to which the eyeglass frame is fitted. Since different grinders represent the shape of the lens differently, the interface between system 10 and the particular grinder converts the parameterization into the format used by the particular grinder.

Once the eyeglasses are fabricated, the eyeglasses are ready for the customer to try on to determine the comfort of fit of the selected design. If the eyeglass frame has been selected using the CD option, the data are transmitted directly to the manufacturer via system 10 for manufacturing.

During remote access of system 10, The user connects to an access site, such as a dedicated manufacturers site. In the two-dimensional modality, system 10 requests the user to input the location in memory of a frontal image of his/her face in a standard image format (e.g. jpeg, gif, tiff, pict, ras etc.). In the three-dimensional modality, system 10 requests the user to input a file that stores the position of a number of points in a three-dimensional mesh in a standard format (e.g. VRML) and of a file that stores a texture map of his/her face. In the 2½ dimensional modality, system 10 requests the user to input a stream of images, either as live video, or pre-recorded in a standard format (e.g. animated GIF, MPEG etc.).

After the appropriate modifications have been chosen, the design is transmitted to the manufacturer, together with prescription information when applicable (including interocular distance), and the complete eyeglass frame is shipped directly to the customer.

While the invention has been described in terms of various specific embodiments, those skilled in the art will recognize that the invention can be practiced with modification within the spirit and scope of the claims.

What is claimed is:

1. A method for selecting and modifying the shape of eyeglasses utilizing a system, said method comprising the steps of:
   receiving at least one image of a person's face, and storing the received image in an image database;
   displaying the stored image to a user;
   generating a model of the person's face with the received image;
   displaying to the user a plurality of styles of eyeglass frames available through the system;
   receiving a style selection by the user;
   receiving the position of the center of the pupils in the image;
   determining the axis of symmetry of the person's face and an approximate contour of the face as an elliptical two-dimensional template;
   automatically determining an appropriate size for a selected eyeglass frame by combining the user style selection and the model of the person's face;
   generating a virtual image of the person wearing the selected eyeglass frame by superimposing the image of the selected eyeglass frame to the image of the face and;
   permitting the user to interactively modify the selected eyeglass frame.

2. A method in accordance with claim 1 wherein said step of determining a proper size of the selected eyeglass frame comprises the step of utilizing a two-dimensional template to determine a position of eyes on the displayed image.

3. A method in accordance with claim 1 further comprising the step of refining the position of the center of the pupils to subpixel precision utilizing template matching.

4. A method in accordance with claim 1 further comprising the step of determining the position of features on the person's face.

5. A method in accordance with claim 1 further comprising the step of receiving a frontal image of the person's face and storing the front image in a database.

6. A method in accordance with claim 1 wherein the system includes a server connected to at least one user device, said method further comprising the step of accessing the server via the user device.

7. A method in accordance with claim 6 wherein the server is connected to the user device via a network.

8. A method in accordance with claim 7 wherein the network is one of the Internet, an intranet, and a wide area network.

9. A method in accordance with claim 1 wherein said step of receiving at least one image comprises the step of receiving two or more images of the person's face simultaneously obtained from two or more cameras oriented in a particular configuration.

10. A method in accordance with claim 9 further comprising the steps of estimating the epipolar geometry of the configuration of the cameras; and generating a three-dimensional model of the person's face.

11. A method in accordance with claim 10 further comprising the steps of:
    determining pixel correspondence along scan-lines using normalized correlation with sub-pixel interpolation;
    determining the depth corresponding to each pixel utilizing triangulation; and
    generating a three-dimensional mesh of the position of the pixels.

12. A method in accordance with claim 11 further comprising the steps of:
    fitting a three-dimensional template of a face to the generated three-dimensional mesh;
    generating an image of the three-dimensional model of the face; and
    superimposing the eyeglass frame model to the person's face model to generate a virtual image of the person's face wearing the eyeglass frame.

13. A method in accordance with claim 1 further comprising:
    representing the shape of the lens using a parameterized curve or a piecewise linear curve where the shape depends upon the position of a number of control points;
    representing the shape of the lens and the front rim using a constrained parameterized curve, where in the lens shape depends upon the position of the control points; and
    constraining the position of the control points to maintain the perimeter of the rim approximately constant and to maintain the tangent at the hinge and bridge, and the maximum curvature below a prescribed bound determined by the properties of the eyeglass frame.

14. A method in accordance with claim 13 further comprising the step of modifying the selected eyeglass frame style by changing the position of the control points while maintaining the perimeter approximately constant.

15. A method in accordance with claim 13 further comprising the steps of:
    maintaining the tangents of the selected eyeglass frame at the hinges and bridge constant; and
    modifying the selected style to have a prescribed perimeter, while minimizing the distortion from the style selected by the user.

16. A method in accordance with claim 1 further comprising the steps of:
    associating a position of a set of control points to a set of perceptual qualities stored in a database; and
    modifying a shape of the lens based upon perceptual qualities.

17. A method in accordance with claim 16 wherein said step of modifying the shape of the lens comprises the step of modifying the shape of the lens based upon perceptual qualities chosen by the user.

18. A method in accordance with claim 17 further comprising the steps of:
    storing selected designs;
    comparing the stored designs;
    performing collaborative filtering; and
    recommending to the user shapes and styles according to selections of other customers that best match the choices of the current customer.

19. A method in accordance with claim 1 further comprising the step of controlling a lens grinding machine in accordance with data received by the system.

20. A method in accordance with claim 1 wherein the system includes a database of maps between the geometry of the eyeglass frame, represented by the position of a number of control points, and the perceptual quality of the shape of eyeglasses, said method further comprising the steps of:
    modifying the selected shape by specifying the amount of each descriptive quality;
    adapting the database to particular clientele; and
    performing collaborative filtering to suggest shapes and a style that matches the choices of other customers with potentially similar preferences.

21. A method in accordance with claim 20 wherein the database is one of a learning database utilizing psychophysical experiments and empirically established database.

22. A method in accordance with claim 1 further comprising the step of modifying the selected style and shape of the eyeglass frame with satisfying constraints due to manufacturing process and inventory.

23. A method in accordance with claim 22 further comprising the steps of:
evaluating the constraints within which any given eyeglass frame can be modified; and
enforcing the constraints during eyeglass frame modification.

24. A method in accordance with claim 1 further comprising the step of receiving prescription data for the lenses.

25. A method in accordance with claim 1 further comprising the step of transmitting the shape and style data to a manufacturer who ships the selected eyeglasses directly to the customer.

26. A method in accordance with claim 1 further comprising the steps of:
selecting landmark points of the person's face;
tracking the selected points through time as the person moves their head; and
estimating the three-dimensional motion of the landmark points on-line.

27. A method in accordance with claim 1 further comprising the step of generating a two and a half dimensional model.

28. A method in accordance with claim 27 further comprising the step of selecting a feature template for relevant facial features.

29. A method in accordance with claim 28 further comprising the steps of:
tracking the position of the feature templates from image frame to image frame; and
selecting a reference frame.

30. A method in accordance with claim 29 wherein said step of selecting a reference frame comprises the steps of:
selecting a reference frame from one of a 2-D Euclidean, 2-D Affine, 2-D Projective, and 3-D Euclidean; and
estimating a transformation.

31. A method in accordance with claim 30 further comprising the step of using the estimate transformation to modify the appearance of an eyeglass frame template.

32. A method in accordance with claim 1 further comprising the step of creating a virtual image of the person's face moving and wearing the eyeglass frame.

* * * * *